(12) United States Patent  
Yoshimoto et al.

(10) Patent No.: US 6,566,002 B2
(45) Date of Patent: May 20, 2003

(54) POLYMER ELECTROLYTE FUEL CELL

(75) Inventors: Yasunori Yoshimoto, Moriguchi (JP); Mitsuo Karakane, Moriguchi (JP); Akira Hamada, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 210 days.

(21) Appl. No.: 09/837,865

(22) Filed: Apr. 19, 2001

(65) Prior Publication Data

US 2001/0038935 A1 Nov. 8, 2001

(30) Foreign Application Priority Data

Apr. 19, 2000 (JP) ........................................ 2000-118089

(51) Int. Cl.[7] ................................................ H01M 8/10
(52) U.S. Cl. ............................ 429/32; 429/30; 429/34; 429/38; 429/39; 429/26; 429/20
(58) Field of Search .............................. 429/30, 32, 34, 429/38, 39, 20, 26

(56) References Cited

U.S. PATENT DOCUMENTS 6,322,914 B1 * 11/2001 Chow et al. .................. 429/13

* cited by examiner

*Primary Examiner*—Patrick Ryan
*Assistant Examiner*—Angela J Martin
(74) *Attorney, Agent, or Firm*—Armstrong, Westerman & Hattori, LLP (57) ABSTRACT

A polymer electrolyte fuel cell shall be provided such that degradation of the fuel cell due to condensed water can be prevented. A polymer electrolyte fuel cell of the present invention is provided wherein a plate A, a plate B, and a plate C are used; a passage is formed on each of the front and rear sides of each of the above-mentioned plates; a cell D or a permeable film E is interposed between two of the above-mentioned plates; a cell unit is thus formed; a plurality of such cell units are integrally laminated to form a polymer electrolyte fuel cell. Fuel gas and cooling water are caused to flow into a humidifying chamber F to humidify fuel gas. The resulting humidified fuel gas is supplied to a fuel chamber G, and moreover, oxidant gas is supplied to an oxidant chamber, thereby generating electricity. It is so arranged that the flow of fuel gas moving inside the above-mentioned humidifying chamber F is a counter flow with respect to the flow of cooling water moving inside the above-mentioned humidifying chamber F; and the flow of fuel gas moving inside the above-mentioned fuel chamber G is a co-flow with respect to the flow of cooling water moving inside the above-mentioned fuel chamber G.

4 Claims, 7 Drawing Sheets

POLYMER ELECTROLYTE FUEL CELL

BACKGROUND OF THE INVENTION

1. Field of the Invention

The present invention relates to a polymer electrolyte fuel cell and more specifically, to the polymer electrolyte fuel cell whose passage is prevented from being blocked by condensed water.

2. Detailed Description of the Prior Art

A polymer electrolyte fuel cell is basically so arranged that an anode and a cathode are provided, with an electrolytic polymer electrolyte film interposed in-between; a fuel gas containing hydrogen is caused to flow on the anode side; and an oxidant gas containing oxygen is caused to flow on the cathode side; thereby generating electricity and water through electrochemical reaction.

In this arrangement, cooled water is supplied to humidify fuel gas or oxidant gas for the purpose of enhancing the electric conductivity of the polymer electrolyte membrane. The resulting humidification not only causes the polymer electrolyte membrane to be wetted but also lowers the heat generated by the exothermic reaction of the fuel cell.

Figure 8:
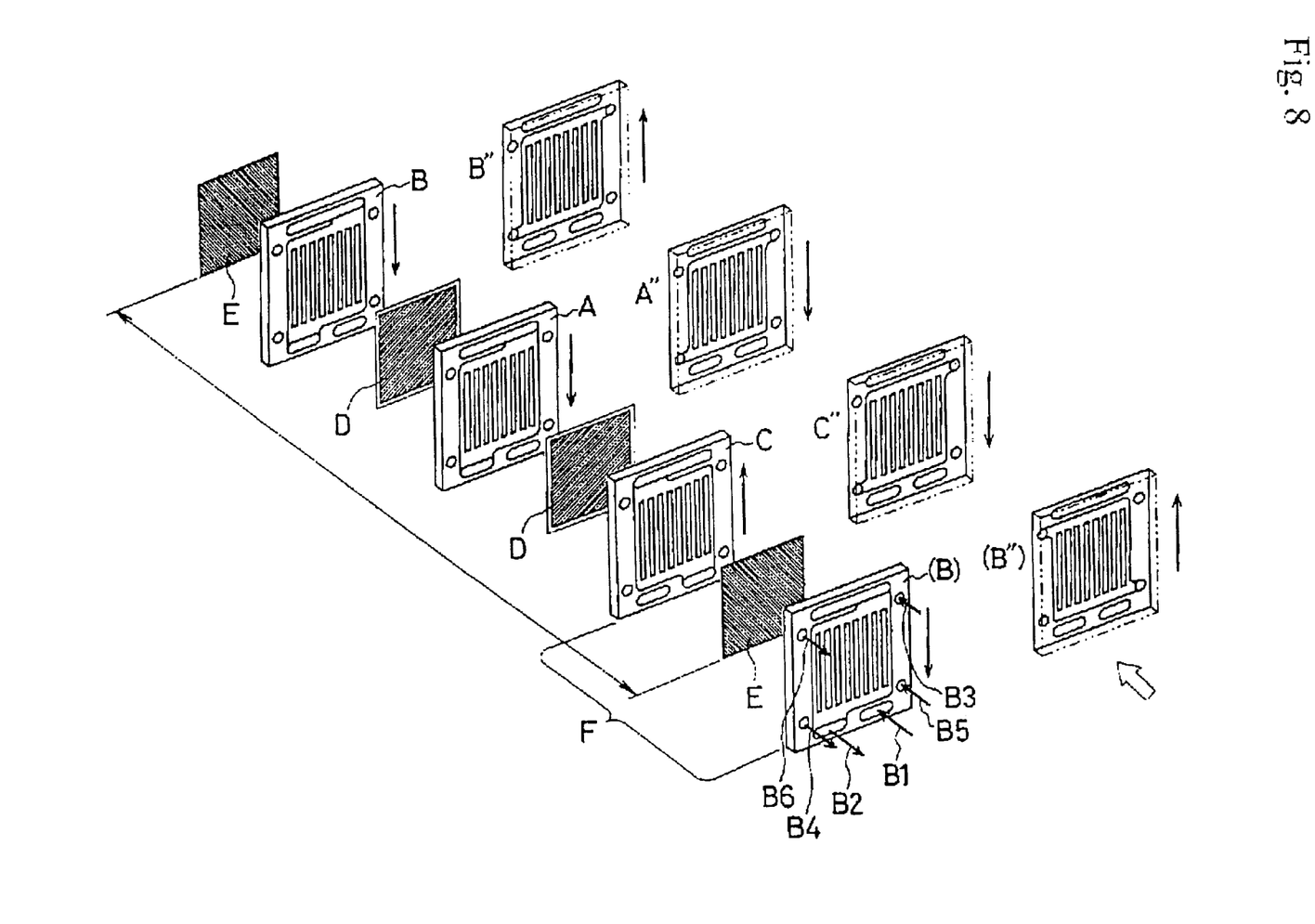
FIG. 8 is an exploded perspective view showing major portions of a prior art polymer electrolyte fuel cell.

FIG. 8 shows an example of a prior art polymer electrolyte fuel cell wherein:

- a plate A, a plate B, and a plate C are used;
- a cell D is disposed on the front side of the plate A;
- another cell D is disposed on the rear side of the plate A;
- a permeable film E is disposed on the rear side of the plate B (on the other side than that side of the plate B which is opposite a cell D);
- another permeable film E is disposed on the front side of the plate C (on the other side than that side of the plate C which is opposite a cell D);
- a cell unit is thus formed;
- a plurality of such cell units are integrally stacked to form a polymer electrolyte fuel cell; and
- a humidifying chamber F is provided between two adjacent cell units, namely between the plate C and a plate (B).

Figure 9:
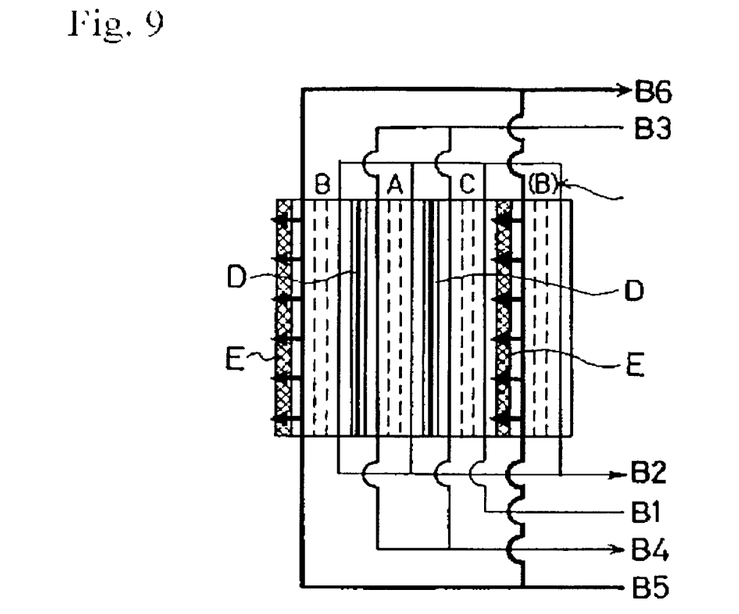
FIG. 9 is an explanatory drawing schematically showing flows of fuel gas, of oxidant gas, and of cooling water.

A passage is formed on each of the front and rear sides of each of the plates A, B, and C (A", B", and C" denote the rear side of the plate A, the rear side of the plate B, and the rear side of the plate C, respectively). Fuel gas, which is supplied from a lateral portion of the polymer electrolyte fuel cell, flows in through a fuel inlet B1, and is discharged through a fuel outlet B2 after passing through a fuel chamber disposed on the anode side of each of the cells D. Oxidant gas flows in through an oxidant inlet B3, and is discharged through an oxidant outlet B4 after passing through an oxidant chamber disposed on the cathode side of each of the cells D. Furthermore, cooling water flows in through a cooling water inlet B5, and is discharged through a cooling water outlet B5 after passing through a humidifying chamber F (disposed on the rear side of the plate B). In this arrangement, fuel gas is humidified by cooling water in the humidifying chamber F, and the polymer electrolyte membrane placed in the center of each cell D is humidified by the resulting humidified fuel gas. FIG. 9 shows a schematic diagram showing flows of fuel gas, of oxidant gas, and of cooling water.

In the case of the above-described polymer electrolyte fuel cell, the flow of fuel gas moving inside the humidifying chamber F is a co-flow with respect to the flow of cooling water moving inside the humidifying chamber F, and the flow of fuel gas moving inside the fuel chamber is a counter flow with respect to the flow of cooling water moving inside the fuel chamber, where the term co-flow signifies a flow in the same direction, and the term counter flow signifies a flow in the opposite direction (the same definitions apply hereinafter), provided that a direction of a flow is not limited to a vertical direction but may include a somewhat oblique direction and a horizontal direction, as well as a direction along a bent or otherwise irregular line, in consideration of the fact that passages have various configurations.

As described above, in the case of a polymer electrolyte fuel cell, electrochemical reaction accompanied by exothermic reaction takes place, and therefore, the temperature of that portion of each plate which faces one of the cells D becomes higher than that of the exterior periphery of the cell D. In the event that fuel gas is humidified by so arranging that the flow of fuel gas is a co-flow with respect to the flow of cooling water as mentioned above, then in the humidifying chamber, the temperature of cooling water at the outlet becomes higher than that at the inlet, and therefore it is possible to obtain saturated humidified fuel gas which has a high temperature (equivalent to the temperature of that portion of the cells D which has the highest temperature).

Figure 10:
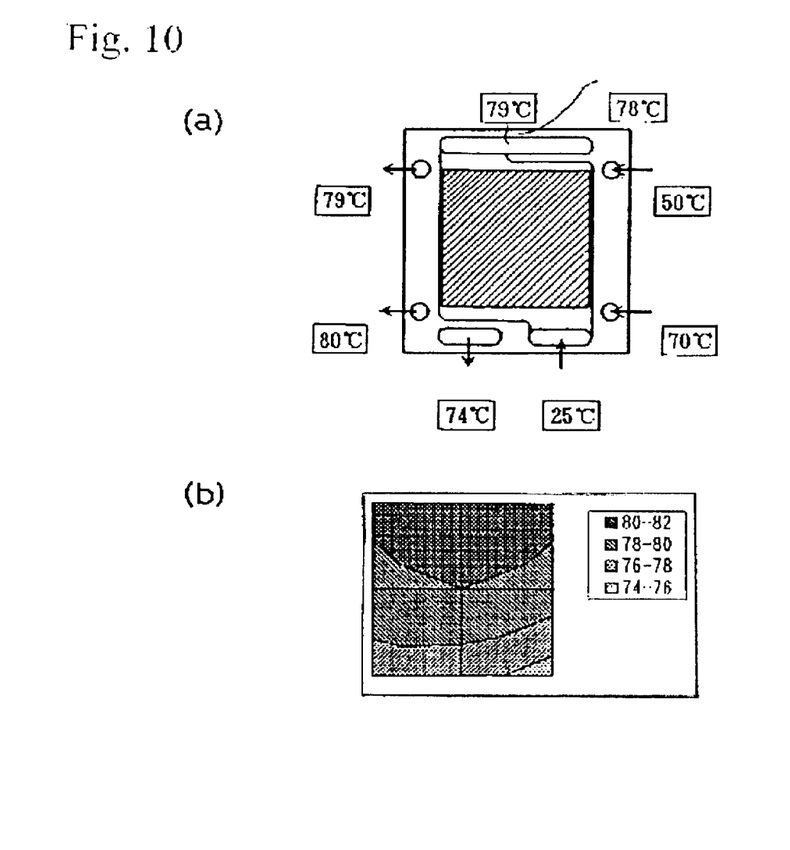
FIG. 10(a) is an explanatory drawing showing the results of measurements of temperatures in a humidifying chamber.
FIG. 10(b) is a diagram showing temperature distributions on a permeable film.

However, as can be seen from FIGS. 10(a) and (b), the temperature of that portion of the humidifying chamber F which is in the neighborhood of the humidified fuel gas outlet is 2 to 3° C. lower than that of humidified fuel gas, and therefore, the water content in the humidified fuel gas is condensed. In the event that condensed water is generated, then fuel gas is hindered from flowing, resulting in the fuel cell performance being degraded. Furthermore, if it is so arranged that the flow of fuel gas moving inside the fuel chamber is a counter flow with respect to the flow of cooling water moving inside the fuel chamber, then the temperature at the outlet of the fuel chamber becomes lower than that at the inlet thereof. In the event that the temperature at the outlet of the fuel chamber lowers, then the water content in fuel gas becomes prone to be condensed, owing also to the fact that fuel gas is consumed at the outlet of the fuel chamber, thereby causing the fuel gas velocity to increase. The resulting condensed water hinders fuel gas from flowing, thereby causing the fuel cell performance to be degraded. Moreover, water is generated owing to reaction on the cathode side. In addition to humidification water, the resulting generated water constitutes still another factor for water condensation. This phenomenon can be prevented by reducing the utilization ratio of fuel or of oxidant, thereby increasing the fuel gas velocity at the fuel chamber outlet, but this practice is undesirable in terms of the fuel cell efficiency.

SUMMARY OF THE INVENTION

It is an object of the present invention, which was made for the purpose. of solving the problem of water being condensed in prior art polymer electrolyte fuel cells, is to provide a polymer electrolyte fuel cell wherein the directions of flows of fuel gas, of oxidant gas, and of cooling water are suitably combined, thereby enabling water condensation to be prevented.

By way of a means for achieving the above-mentioned object, the polymer electrolyte fuel cell of the present invention is so arranged that

- a polymer electrolyte membrane having an anode on one side and a cathode on the other side constitutes a cell;
- a fuel chamber with fuel gas flowing inside is provided on the anode side of the above-mentioned cell;

an oxidant chamber with oxidant gas flowing inside is provided on the cathode side of the above-mentioned cell;

the above-mentioned cell, the above-mentioned fuel chamber, and the above-mentioned oxidant chamber constitute a component cell;

a plurality of such component cells are laminated together to constitute a cell unit;

a plurality of such cell units are provided;

a humidifying chamber with cooling water flowing inside is provided between two adjacent cell units, thereby humidifying either fuel gas or oxidant gas, or both fuel gas and oxidant gas; and the flow of fuel gas moving inside the above-mentioned fuel chamber, as well as the flow of oxidant gas moving inside the above-mentioned oxidant chamber, is a co-flow with respect to the flow of cooling water moving inside the above-mentioned humidifying chamber.

Furthermore, the above-mentioned polymer electrolyte fuel cell is so arranged that the flow of fuel gas moving inside the above-mentioned humidifying chamber is a counter flow with respect to the flow of cooling water moving inside the above-mentioned humidifying chamber; and the flow of fuel gas moving inside the above-mentioned fuel chamber is a co-flow with respect to the flow of cooling water moving inside the above-mentioned fuel chamber.

Moreover, in the above-mentioned polymer electrolyte fuel cell, fuel gas and oxidant gas are replaced with each other, thereby causing oxidant gas to be humidified in the humidifying chamber.

If it is so arranged that the flow of fuel gas moving inside the fuel chamber, as well as the flow of the oxidant gas moving inside the oxidant chamber, is a co-flow with respect to the flow of cooling water moving inside the humidifying chamber, then the resulting cooling water is used to cool the heat generated in the cells, and therefore, the temperature of cooling water at the outlet becomes higher than that at the inlet.

The temperature of the fuel gas or of the oxidant gas at the outlet of the fuel chamber or of the oxidant chamber, respectively, becomes higher than the temperature of the fuel gas or of the oxidant gas at the inlet of the fuel chamber or of the oxidant chamber, respectively, since the flow of fuel gas moving inside the fuel chamber, as well as the flow of the oxidant gas moving inside the oxidant chamber, is a co-flow with respect to the flow of cooling water moving inside the humidifying chamber. For this reason, fuel gas or oxidant gas is consumed at the outlet of the fuel chamber or of the oxidant chamber, respectively, and therefore, water condensation which would be caused by reduced flow velocity can be prevented.

In the event that a polymer electrolyte fuel cell is so arranged that the flow of fuel gas moving inside the humidifying chamber is a counter flow with respect to the flow of cooling water moving inside the humidifying chamber, and the flow of fuel gas moving inside the fuel chamber is a co-flow with respect to the flow of cooling water moving inside the fuel chamber; then the resulting cooling water is used to cool the heat generated in the cells, and therefore, the temperature of cooling water supplied is bound to be lower (by 5 to 20° C.) than that of the cells. Since the flow of fuel gas moving inside the humidifying chamber is a counter flow with respect to the flow of cooling water moving inside the humidifying chamber, saturated humidified fuel gas can be obtained from the humidifying chamber such that the temperature of the above-mentioned fuel gas is lower than the temperatures of the cells and than the temperature of a portion in the neighborhood of the humidified fuel gas outlet. For this reason, humidified fuel gas can be supplied to the fuel chamber without causing any water content in the humidified fuel gas to be condensed.

Furthermore, since the flow of fuel gas moving inside the fuel chamber is a co-flow with respect to the flow of cooling water moving inside the fuel chamber is a co-flow with respect to the flow of cooling water moving inside the fuel chamber, the temperature of the fuel gas at the outlet of the fuel chamber becomes higher than the temperature of the fuel gas at the inlet of the fuel chamber. For this reason, fuel gas is consumed at the outlet of the fuel chamber, and therefore water condensation which would be caused by reduced flow velocity can be prevented.

In this connection, if it is so arranged that the flow of oxidant gas moving inside the oxidant chamber is a co-flow with respect to the flow of cooling water moving inside the oxidant chamber, then the temperature at the outlet of the fuel chamber becomes higher, and therefore, it is possible to increase the fuel utilization ratio while preventing water from being condensed at the outlet of the fuel chamber.

In the case of the polymer electrolyte fuel cell according to the present invention, the same results as above can be obtained in the event that the flow of fuel gas and the flow of oxidant gas are replaced with each other, thereby humidifying oxidant gas.

DETAILD DESCRIPTION OF THE PREFERRED EMBODIMENT

In the next place, the first embodiment of the polymer electrolyte fuel cell of the present invention will be described on the basis of attached drawings. The component members of this embodiment, which are the same as those of the above-mentioned prior art example, are represented by the same symbols that are used for those of the above-mentioned prior art fuel cell.

Figure 1:
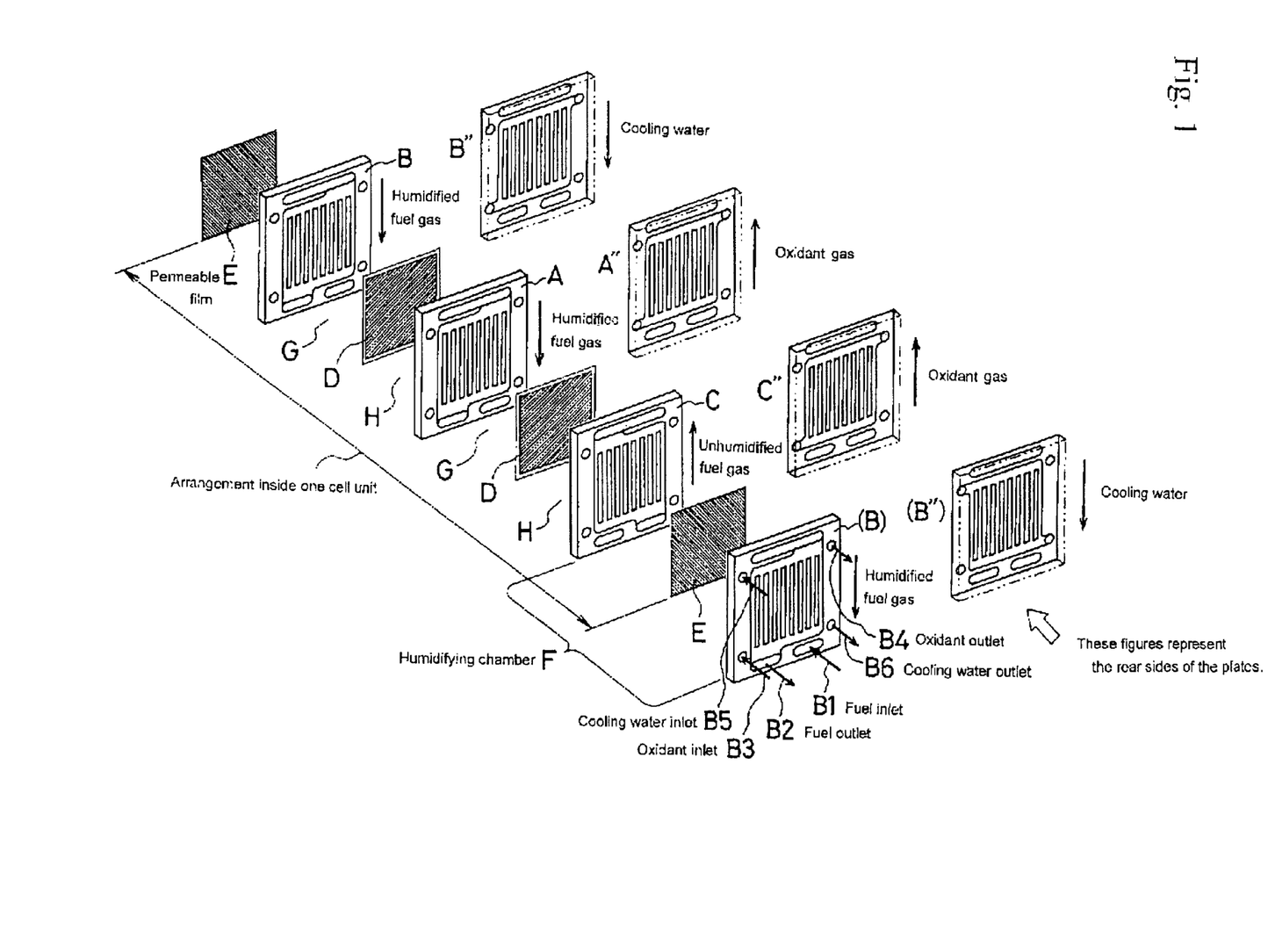
FIG. 1 is an exploded perspective view showing major portions of the first embodiment of the polymer electrolyte fuel cell of the present invention.

FIG. 1 shows a polymer electrolyte fuel cell wherein

- a plate A, a plate B, and a plate C are used;
- a passage is formed on each of the front and rear sides of each of the plates A, B, and C (A", B", and C" denote the rear side of the plate A, the rear side of the plate B, and the rear side of the plate C, respectively);
- a cell D is disposed between the plate A and the plate B;
- another cell D is disposed between the plate A and the plate C;
- a permeable film E is disposed on the rear side of the plate B;
- another permeable film E is disposed on the front side of the plate C;
- a cell unit is thus formed; and
- a plurality of such cell units are integrally laminated to form a polymer electrolyte fuel cell.

A plate (B) of an adjacent cell unit is located on the front side of the place C, and a humidifying chamber F is formed in such a way that the above-mentioned permeable film E disposed on the front side of the plate C is interposed between the above-mentioned plate (B) and the above-mentioned plate C.

Furthermore:

- the anode side of the above-mentioned cell D disposed between the plate A and the plate C faces the front side of the plate A;
- the anode side of the above-mentioned cell D disposed between the plate A and the plate B faces the front side of the plate B;
- a fuel chamber G is formed on the front side of the plates A;
- another fuel chamber G is formed on the front side of the plates B;
- the cathode side of the above-mentioned cell D disposed between the plate A and the plate B faces the rear side of the plate A;
- the cathode side of the above-mentioned cell D disposed between the plate A and the plate C faces the rear side of the plate C;
- an oxidant chamber H is formed on the rear side of the plate A (on the side A"); and
- another oxidant chamber H is formed on the rear side of the plate C (on the side C").

A fuel gas inlet a fuel gas outlet, an oxidant gas outlet, an oxidant gas inlet, an oxidant gas outlet, a cooling water inlet, and a cooling water outlet are formed on each plate. On the plate (B) of the adjacent cell unit are also formed a fuel inlet B1, a fuel outlet B2, an oxidant inlet B3, an oxidant outlet B4, a cooling water inlet B5, and a cooling water outlet B6. In this arrangement, however, the locations of the inlets and the outlets for oxidant gas and for cooling water are reverse to those in the prior art example.

Figure 2:
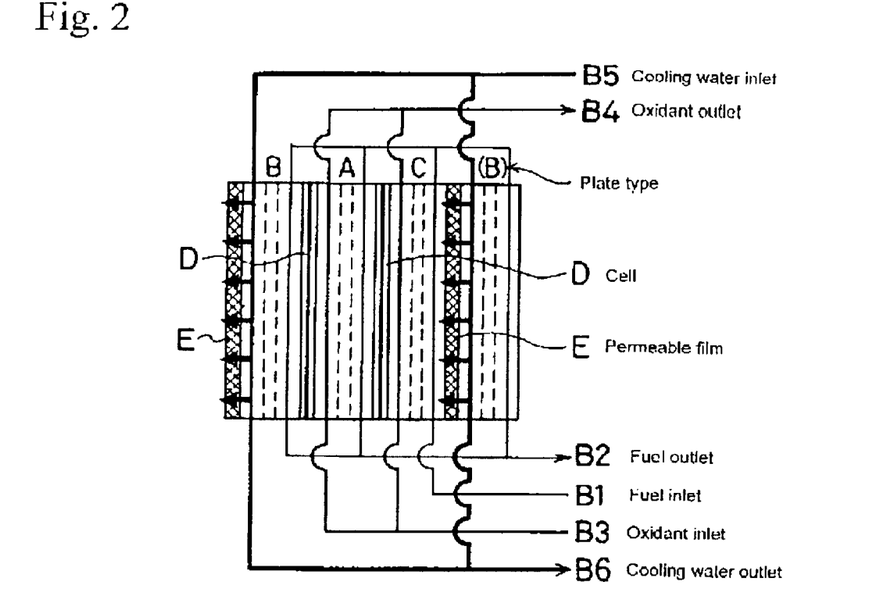
FIG. 2 is an explanatory drawing schematically showing flows of fuel gas, of oxidant gas, and of cooling water, in the above-mentioned first embodiment of the polymer electrolyte fuel cell.

In this arrangement, fuel gas flows in through the fuel inlet B1 on the adjacent plate (B) and flows upward from the lower portion of the humidifying chamber F through a passage on the rear side of the plate C. Cooling water which flows in through the cooling water inlet B5 on the plate (B) passes through the cooling water passage on each of the plates C, A, and B, and flows downward through the passage on the rear side of the plate B. Cooling water also flows downward through the passage on the rear side of the adjacent plate (B); namely, cooling water flows inside the humidifying chamber F, with the result that inside the humidifying chamber F, the flow of fuel gas is a counter flow with respect to the flow of cooling water. In this arrangement, a permeable film E exists between the plate (B) and the plate C as mentioned above, and therefore, as shown in FIG. 2, part of the cooling water flowing through the passage on the rear side of the plate (B) moves to the front side of the plate C, and cools unhumidified fuel gas flowing through a passage on the front side of the plate C. Namely, fuel gas is cooled by cooling water inside the humidifying, chamber F.

Since cooling water is used to cool the heat generated in each cell unit, the temperature of the cooling water supplied is bound to be lower than that of the cell unit. If it is so arranged that the flow of fuel gas moving inside the humidifying chamber is a counter flow with respect to the flow of cooling water moving inside the humidifying chamber, then saturated humidified fuel gas can be obtained from the humidifying portion such that the temperature of the above-mentioned fuel gas is lower than the temperature of the cell unit and than the temperature of a portion in the neighborhood of the humidified fuel gas outlet on the plate C. For this reason, humidified fuel gas can be supplied to the fuel chamber without causing any water content in the humidified fuel gas to be condensed.

Figure 3:
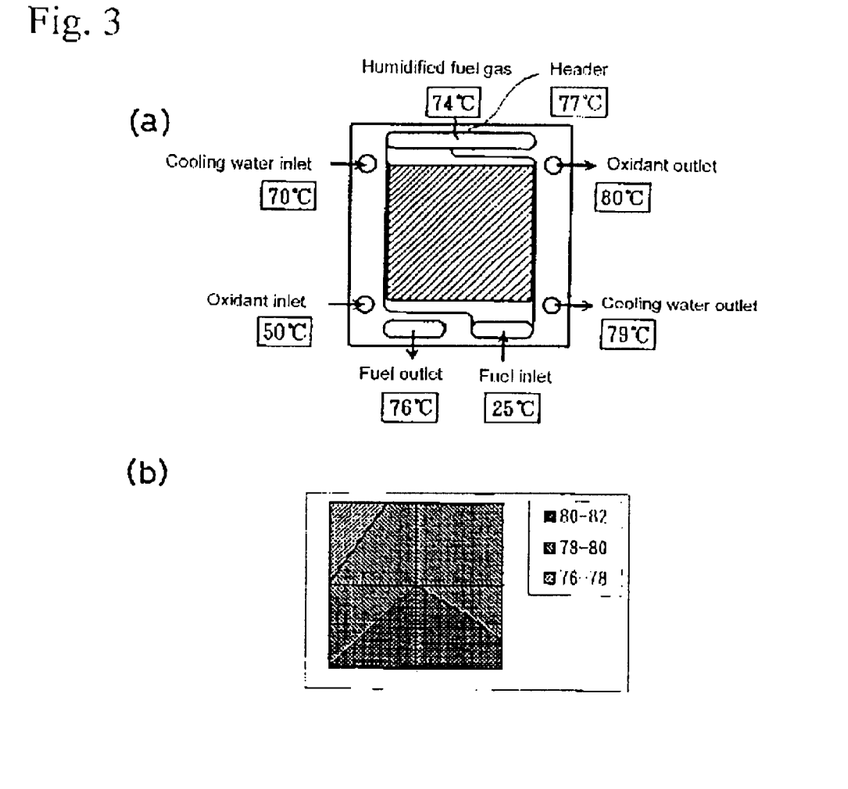
FIG. 3(a) is an explanatory drawing showing the results of measurements of temperatures in a humidifying chamber.
FIG. 3(b) is a diagram showing temperature distributions on a permeable film.

FIG. 3(a) shows the results of measurements of temperatures in the humidifying chamber F. The temperature of the fuel gas humidified by cooling water was approximately 74° C., while the temperature of a portion in the neighborhood of the humidified gas outlet (the temperature of a header) was approximately 77° C. In the case of a prior art example shown in FIG. 10(a), the temperature of the fuel gas humidified by cooling water was approximately 79° C., while the temperature of the header was approximately 78° C.; namely, the temperature of the humidified fuel gas was higher than that of the header, and therefore, the humidified fuel gas was cooled, thereby causing the humidified fuel gas to be cooled by the header, resulting in the water content in the above-mentioned fuel gas to be condensed. FIGS. 3(b) and 10(b) each show temperature distributions pertaining to a permeable film E.

Fuel gas humidified by cooling water inside the humidifying chamber F is supplied to the above-mentioned fuel chamber C, and flows downward through a passage on the front side of the above-mentioned plate A and through a passage on the above-mentioned plate B. Cooling water supplied through the cooling water inlet B5 on the plate (B) passes through a cooling water passage on each of the plates C, A, and B, in this order, and flows on the rear side of the plate, thereby cooling each of the plates C, A, and C. Then the above-mentioned cooling water passes through another cooling water passage (a return passage) and is discharged through the cooling water outlet B6 on the plate B.

FIG. 1 shows a case wherein cooling water is discharged to the near side through the cooling water outlet B6 on the adjacent plate B. However, there is another case wherein cooling water, which progresses successively toward the rear of an integrally stacked fuel cell, flows through each humidifying chamber F disposed between two adjacent cell units, and is discharged through the other end of the fuel cell.

On the plate B, humidified fuel gas flows downward through the front passage facing the fuel chamber G as mentioned above, and cooling water flows downward through the rear passage facing the humidifying chamber F. It follows, therefore, that the flow of fuel gas moving inside the fuel chamber G is a co-flow with respect to flow of cooling water moving inside the humidifying chamber F (in the prior art example, these flows are counter with respect to each other.)

Since it is so arranged, as mentioned above, the flow of fuel gas is a co-flow with respect to the flow of cooling water, the temperature of the fuel gas at the outlet of the fuel chamber G becomes higher than the temperature of the fuel gas at the inlet of the fuel chamber G. For this reason, fuel gas is consumed at the outlet of the fuel chamber G, and therefore water condensation which would be caused by reduced flow velocity can be prevented. As a result, stable fuel cell performance can be achieved with no condensed water hampering the flow of fuel gas.

Now an explanation pertaining to oxidant gas will be made. Oxidant gas flowing in through the oxidant inlet B3 is supplied to the above-mentioned oxidant chamber H. Namely, oxidant gas flows upward through the passage facing the rear side of the plate A and through the passage facing the rear side of the plate C, thus constituting a counter flow with respect to the above-mentioned cooling water flow.

As mentioned above, not only is humidified gas supplied to the fuel chamber G, but also oxidant gas is supplied to the oxidant chamber H, thereby causing the polymer electrolyte fuel cell to generate electricity. In the course of the generation of electricity, the polymer electrolyte membrane of each cell D is wetted by the water content in humidified fuel gas to keep electric conductivity satisfactory, and the fuel cell main body is cooled by cooling water.

Figure 4:
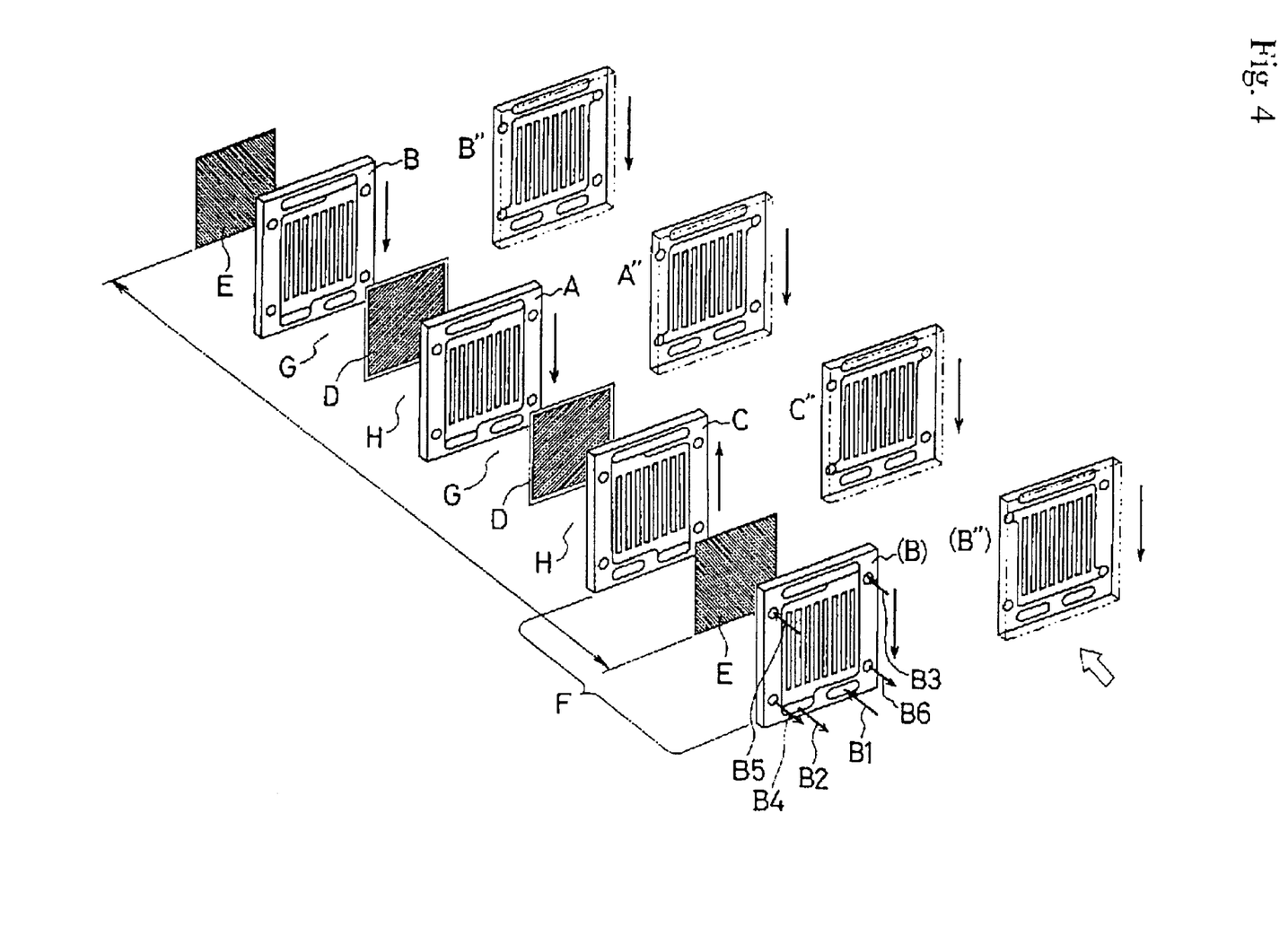
FIG. 4 is an exploded perspective view showing major portions of the second embodiment of the polymer electrolyte fuel cell of the present invention.
Figure 5:
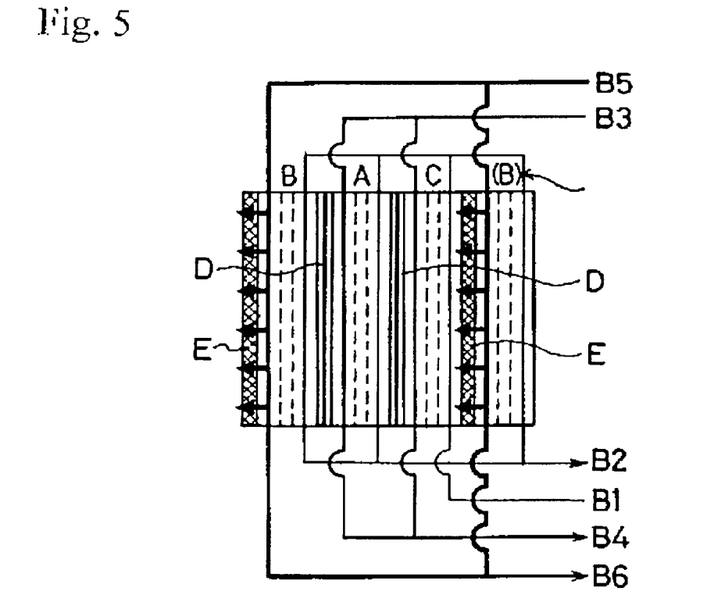
FIG. 5 is an explanatory drawing schematically showing flows of fuel gas, of oxidant gas, and of cooling water, in the above-mentioned second embodiment of the polymer electrolyte fuel cell.

FIG. 4 shows the second embodiment of the polymer electrolyte fuel cell of the present invention, wherein the arrangement is the same as that of the above-mentioned first embodiment, except that the locations of the oxidant inlet B3 and of the oxidant outlet B4 of the second embodiment are reverse to those of the first embodiment. In the case of the second embodiment, fuel gas is supplied to each fuel chamber G after being humidified by cooling water in the humidifying chamber F, just as in the case of the first embodiment. However, the second embodiment is different from the first embodiment in that the flow of oxidant gas moving inside the oxidant chamber H is a co-flow with respect to the flow of cooling water moving inside the oxidant chamber H. FIG. 5 is a schematic diagram showing flows of fuel gas, of oxidant gas, and of cooling water, with component members integrally laminated.

Since it is so arranged, as mentioned above, that the flow of oxidant gas moving inside the oxidant chamber H is a co-flow with respect to the flow of cooling water moving inside the oxidant chamber H. the temperature at the outlet of the fuel chamber G becomes higher, and therefore, the water content can be prevented from being condensed at the outlet of the fuel chamber G. As a result, the fuel utilization ratio improves, as compared the above-mentioned first embodiment.

Figure 6:
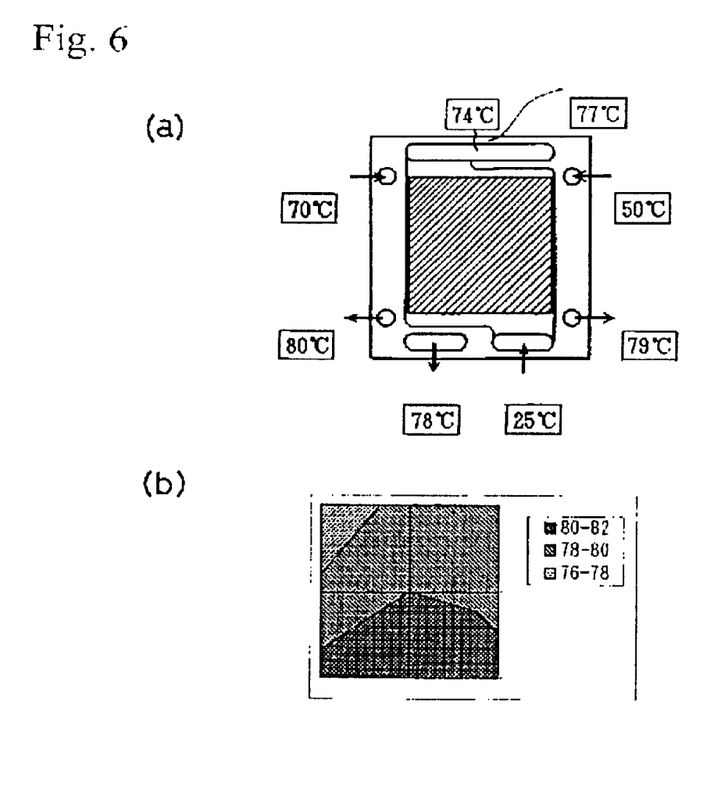
FIG. 6(a) is an explanatory drawing showing the results of measurements of temperatures in a humidifying chamber.
FIG. 6(b) is a diagram showing temperature distributions on a permeable film.

FIG. 6(a) shows the results of temperature measurements. The temperature at the fuel outlet turned out to be approximately 78° C., which is higher than the fuel outlet temperature of approximately 76° C. in the case of the first embodiment. In this connection, the fuel outlet temperature in the prior art example as shown in FIG. 10(a) was approximately 74° C. FIG. 6(b) shows temperature distributions on a permeable film E.

With these embodiments taken into consideration, it is desirable that the flow of humidified fuel gas flow moving inside the fuel chamber G, as well as the flow of oxidant gas moving inside the oxidant chamber H, is a parallel flow with respect to the flow of cooling water moving inside the humidifying chamber F.

Figure 7:
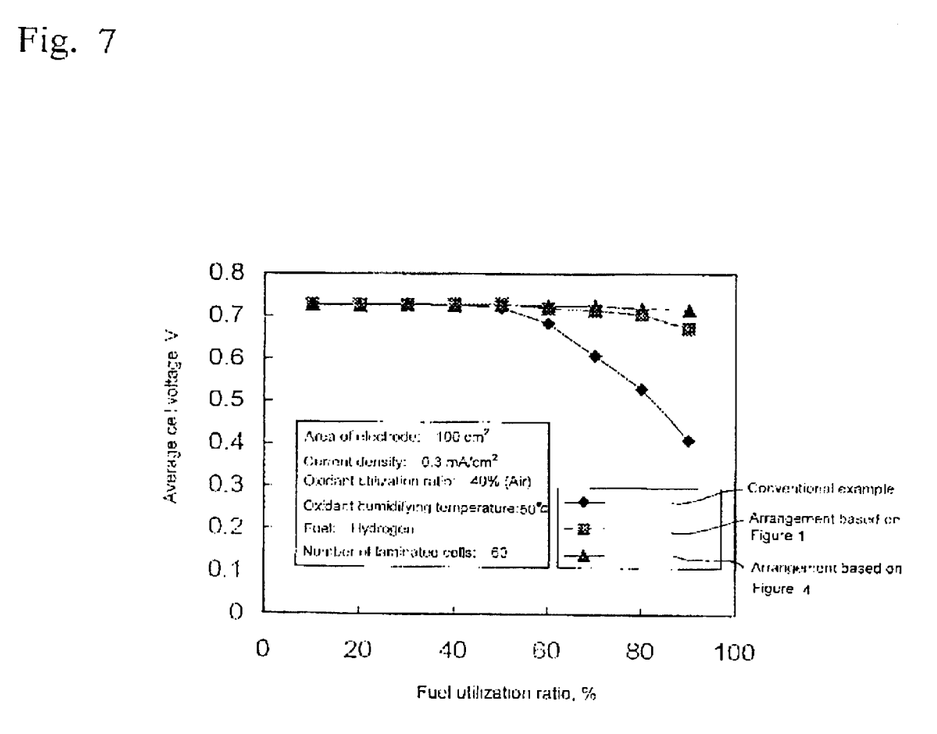
FIG. 7 is a graph showing the results of an experiment conducted to determine relationships between fuel utilization ratios and cell voltages.

FIG. 7 shows the results of an experiment carried out on fuel utilization ratios. In the case of the prior art example, the cell voltage dropped when the fuel utilization ratio exceeded 40%, and the cell voltage drop rate increased with rising fuel utilization ratio, until the cell voltage degreased to approximately 50% when the fuel utilization ratio exceeded 90%. In contrast to the above, in the case of the polymer electrolyte fuel cells of the present invention, almost no cell voltage drop was observed in the range of high fuel utilization ratios.

Incidentally, in both of the above-described embodiments of the present invention, fuel gas is humidified in the humidifying chamber F. However, it may be so arranged that oxidant gas is humidified. In this case, fuel gas and oxidant gas may be replaced with each other to humidify oxidant gas in the humidifying chamber F so that the polymer electrolyte membrane of each of the above-mentioned cells D may be wetted when resulting humidified oxidant gas flows inside the oxidant gas chamber H. In the event oxidant gas is humidified as mentioned above, the same effects can be obtained as in the case wherein fuel gas is humidified as mentioned above. Furthermore, it may be so arranged that both fuel gas and oxidant gas are humidified.

As described above, any polymer electrolyte fuel cell of the present invention is so arranged that the flow of fuel gas moving inside a fuel chamber, as well as the flow of oxidant gas moving inside an oxidant chamber, is a co-flow with respect to the flow of cooling water moving inside a humidifying chamber. Therefore, the temperature at the outlet of the fuel chamber or of the oxidant chamber is higher than that at the inlet of the fuel chamber or of the oxidant chamber, respectively.

For this reason, fuel gas or oxidant gas is consumed at the outlet of the fuel chamber or of the oxidant chamber, respectively, and consequently, water condensation which would be caused by reduced flow velocity can be prevented. As a result, stable fuel cell performance can be achieved with no condensed water hampering the flow of fuel gas.

Furthermore, since it is so arranged that the flow of fuel gas moving inside the humidifying chamber is a counter flow with respect to the flow of cooling water moving inside the humidifying chamber, saturated humidified fuel gas can be obtained from the humidifying chamber such that the temperature of the above-mentioned fuel gas is lower than the temperatures of the cells and than the temperature of a portion in the neighborhood of the humidified fuel gas outlet. For this reason, humidified fuel gas can be supplied to the fuel chamber without causing any water content in the humidified fuel gas to be condensed. Furthermore, stable fuel cell performance can be achieved with no condensed water hampering the flow of fuel gas.

What is claimed is:

1. A polymer electrolyte fuel cell wherein
a polymer electrolyte membrane of a cell has an anode on one side and a cathode on the other side;
a fuel chamber with fuel gas flowing inside is provided on the anode side of said cell;
an oxidant chamber with oxidant gas flowing inside is provided on the cathode side of said cell;
said cell, said fuel chamber, and said oxidant chamber constitute a component cell;
a plurality of said component cells are stacked together to constitute a cell unit;

a humidifying chamber with cooling water flowing inside is provided between said cell units adjacent to each other, thereby humidifying either fuel gas or oxidant gas, or both fuel gas and oxidant gas; and the flow of fuel gas moving inside said fuel chamber, as well as the flow of oxidant gas moving inside said oxidant chamber, is a co-flow with respect to the flow of cooling water moving inside said humidifying chamber.

2. A polymer electrolyte fuel cell wherein a polymer electrolyte membrane of a cell has an anode on one side and a cathode on the other side;

a fuel chamber with fuel gas flowing inside is provided on the anode side of said cell;

an oxidant chamber with oxidant gas flowing inside is provided on the cathode side of said cell;

said cell, said fuel chamber, and said oxidant chamber constitute a component cell;

a plurality of said component cells are stacked together to constitute a cell unit;

between said cell units adjacent to each other is provided a humidifying chamber with fuel gas and cooling water flowing inside to humidify fuel gas;

fuel gas humidified by passing through said humidifying chamber humidifies said polymer electrolyte membrane;

the flow of fuel gas moving inside said humidifying chamber is a counter flow with respect to the flow of cooling water moving inside said humidifying chamber; and the flow of fuel gas moving inside said fuel chamber is a co-flow with respect to the flow of cooling water moving inside said fuel chamber.

3. A polymer electrolyte fuel cell as defined in claim 1, wherein the flow of oxidant gas moving inside said oxidant chamber is a co-flow with respect to the flow of cooling water moving inside said oxidant chamber.

4. A polymer electrolyte fuel cell as defined in claim 2 or 3, wherein fuel gas and oxidant gas are replaced with each other to humidify oxidant gas in said humidifying chamber.

* * * * *